United States Patent [19]
Manning

[11] Patent Number: 5,781,681
[45] Date of Patent: Jul. 14, 1998

[54] BEND LIMITING STRAIN RELIEF BOOT

[75] Inventor: Randy Marshall Manning. New Cumberland, Pa.

[73] Assignee: The Whitaker Corporation, Wilmington, Del.

[21] Appl. No.: 748,761

[22] Filed: Nov. 14, 1996

Related U.S. Application Data

[60] Provisional application No. 60/007,494 Nov. 22, 1995.

[51] Int. Cl.$^6$ ............................................. G02B 6/36
[52] U.S. Cl. ................................. 385/86; 385/87; 385/136
[58] Field of Search ........................ 385/86, 87, 136, 385/62, 76, 81

[56] References Cited

U.S. PATENT DOCUMENTS

| | | | |
|---|---|---|---|
| 4,319,802 | 3/1982 | Bowes | 385/86 |
| 4,793,684 | 12/1988 | Oppenlander | 385/86 |
| 4,812,009 | 3/1989 | Carlisle et al. | 385/62 |
| 5,073,042 | 12/1991 | Mulholland et al. | 385/69 |
| 5,073,044 | 12/1991 | Egner et al. | 385/86 |
| 5,094,552 | 3/1992 | Monroe et al. | 385/76 |
| 5,101,463 | 3/1992 | Cubukciyan et al. | 385/72 |
| 5,142,601 | 8/1992 | Shibata et al. | 385/86 |
| 5,151,960 | 9/1992 | Warner et al. | 385/53 |
| 5,151,962 | 9/1992 | Walker et al. | 385/86 |
| 5,202,942 | 4/1993 | Collins et al. | 385/87 |
| 5,222,169 | 6/1993 | Chang et al. | 385/87 |
| 5,276,753 | 1/1994 | Higuchi et al. | 385/87 |
| 5,329,603 | 7/1994 | Watanabe et al. | 385/86 |
| 5,347,603 | 9/1994 | Belenkiy et al. | 385/86 |
| 5,390,272 | 2/1995 | Repta et al. | 385/100 |
| 5,425,120 | 6/1995 | Peterson et al. | 385/87 |

*Primary Examiner*—Rodney B. Bovernick
*Assistant Examiner*—Hemang Sanghavi

[57] ABSTRACT

A bend limiting strain relief boot 1 is disclosed wherein, an outer diameter of the boot 1 varies as a function of a desired minimum bend radius ($\rho$), a side load applied (F), and the modulus of elasticity (E) of a material from which the boot 1 is made. An outer diameter ($d_o(\theta)$) of the boot varies as a function of its distance from a distal end of the connector following the relationship:

$$d_o(\theta)l = \left[ d_i^4 + \frac{64 \cdot F \cdot \rho^2 \cdot (1 - \cos(\theta))}{E \cdot \pi} \right]^{1/4}$$

wherein $d_i$ is the inner diameter of the boot, F is the maximum applied load, $\rho$ is the desired minimum radius of curvature, $\theta$ is the angle of the applied load relative to said neutral axis, and E is the modulus of elasticity of the selected material.

5 Claims, 3 Drawing Sheets

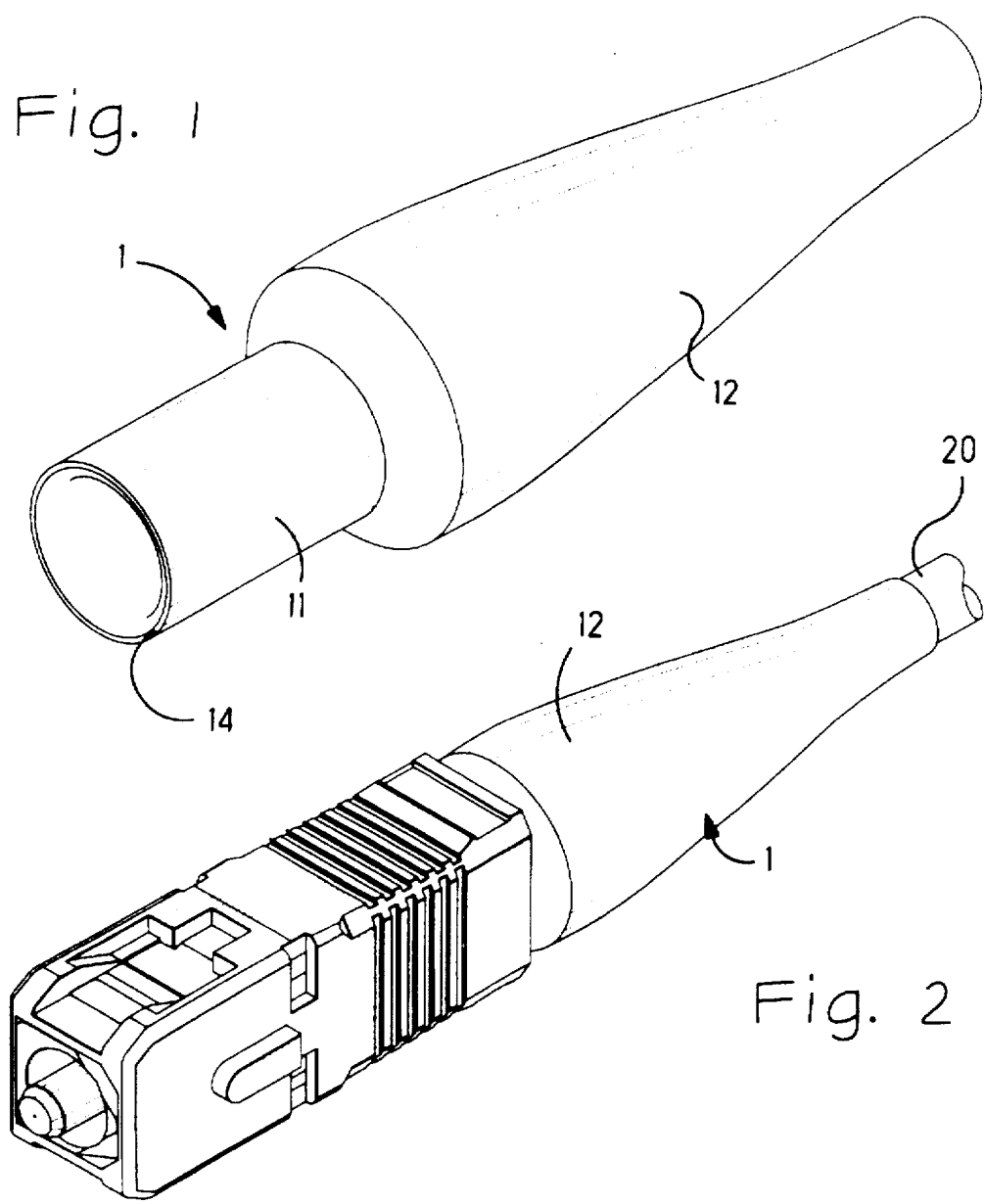
Fig. 1
Fig. 2
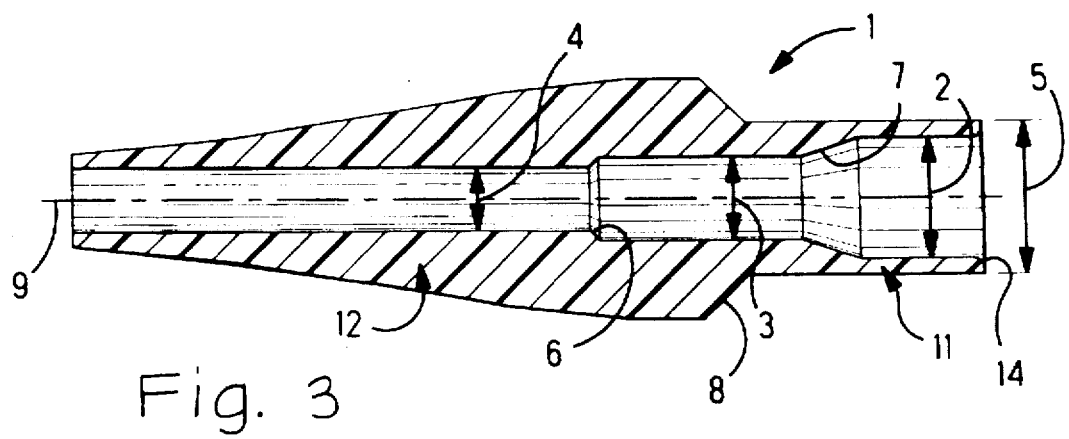
Fig. 3

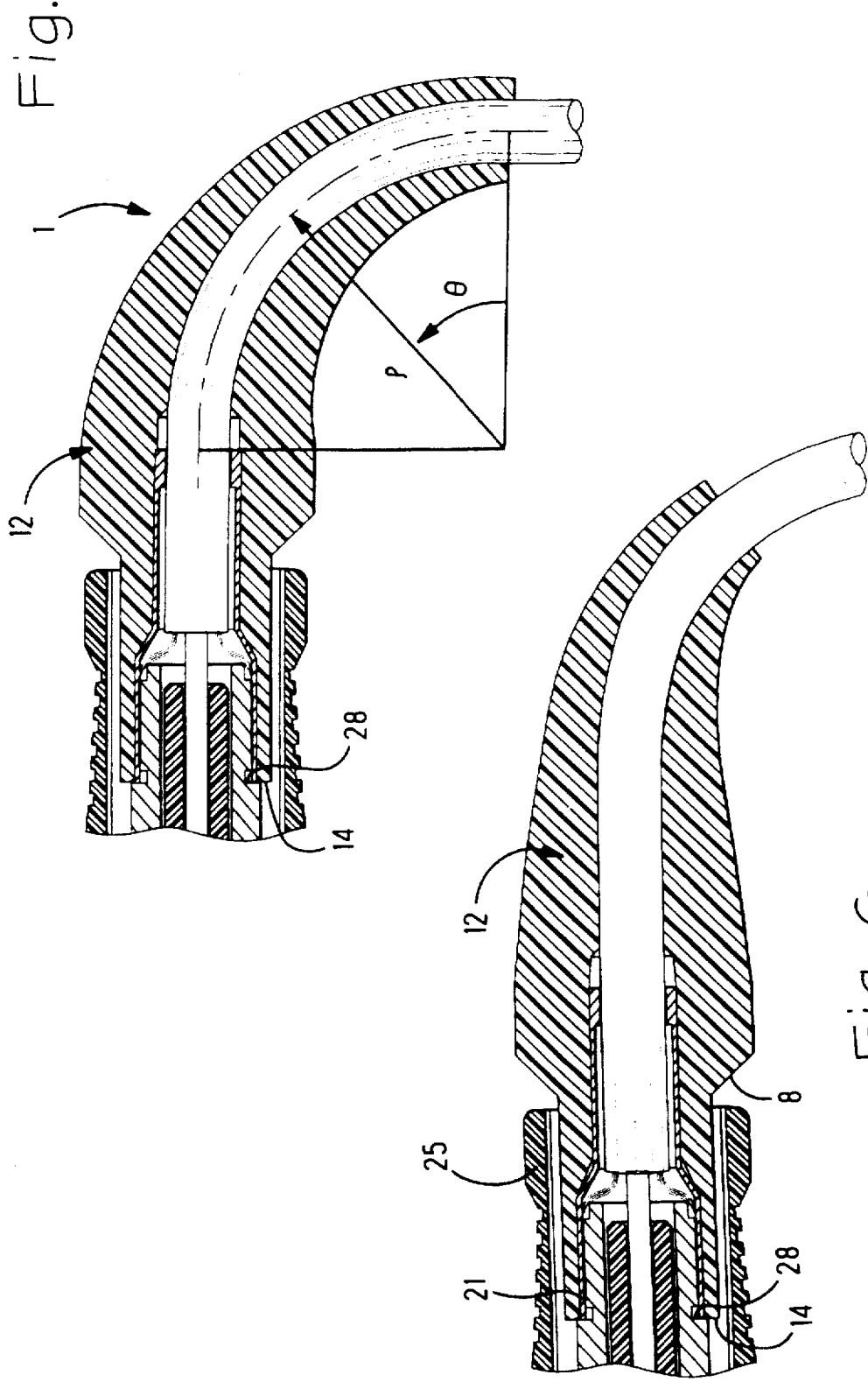

5,781,681

1

BEND LIMITING STRAIN RELIEF BOOT

This application claims the benefit of U.S. provisional application Ser. No. 60/007,494, filed Nov. 22, 1995.

FIELD OF THE INVENTOIN

The present invention relates generally to strain relief boots for electrical and fiber optic cables and more specifically to a strain relief boot for a connector that controls the bend radius of an attached cable in response to a side load.

BACKGROUND OF TNE INVENTOIN

Fiber optic cables and category V copper cables are among those types of cables that are able to transmit relatively high bandwidth signals as compared to other conventional electrical cables. In order to maintain suitable operating performance, these higher performance cables must not experience a bend having a radius smaller than a minimum bend radius at any point along the run of cable. A particular minimum bend radius depends upon the type of cable and the transmission characteristics of the cable being used. It is conventional and desirable for ease of installation and use to have flexible cable. Mechanically, therefore, the cable is capable of bending with a radius below the minimum bend radius for the cable. At the point of a mating connection, as is also conventional, connectors are attached at one end to a fixed point and are perpendicular to a plane in which the fixed point lies. This arrangement presents a cantilever situation with a connector representing the lever arm. The connector is typically terminated to the flexible cable. The connectors is relatively speaking stiffer than the cable to which it is terminated. When terminated and in use, these cables may be exposed to transverse forces. Without controlling a bend, a force that is transverse to the lever arm results in a 90 degree bend at the transition between the end of the connector and the cable. A 90 degree bend can result in unacceptable losses for fiber optic and category V cable if the transition is overly abrupt. It is desirable, therefore, to control the bend over 90 degrees of travel so that a direction change may be made in the length of cable while maintaining a minimum bend radius over the path of travel. The Bellcore Generic Requirements GR-326-CORE issue #1 specifies a maximum change in attenuation of 0.5dB in response to a 4.4 pound-force (1bf) side load for a terminated fiber optic cable for compliance therewith. A typical minimum bend radius for a single mode fiber optic cable is approximately 0.45 inches allowing some room for error on the side of a larger bend radius.

It is known to provide a tubular length of elastomeric or other polymeric material in order to control the bend radius of a terminated cable. Staggered openings in the tubular length provide flexibility. As two edges of the staggered openings meet, additional movement in the one opening is limited which permits flexure at the next opening. Openings are staggered to provide flexure at any angle in the plane transverse to the connector termination axis. Further improvements to the bend relief boot include the use of a bump at the middle of the openings to limit flexure and to provide additional compliance at a higher force in a single segment to more evenly distribute compressive forces along the length of the boot.

SUMMARY OF THE INVENTION

It is an object of the present invention to control the bend radius of a cable at the transition between a relatively stiff connector and a length of cable in response to a side load applied to the cable.

2

It is a further object of the present invention to minimize the length of the strain relief boot, by providing a constant bend radius over a 90 degree transition in response to a side load.

It is a further object of the present invention to reduce the time and expense of prototype and testing phases of product development for a strain relief boot.

A bend limiting boot comprises a tubular length of elastomeric or other polymeric material disposed at a distal end of a connector. The tubular length has a neutral center axis with an outer diameter ($d_o(\theta)$) of the boot varying as a function of its distance from the distal end of the connector in its deflected state following the relationship, $$d_o(\theta)l = \left[ d_i^4 + \frac{64 \cdot F \cdot \rho^2 \cdot (1-\cos(\theta))}{E \cdot \pi} \right]^{1/4}$$

wherein $d_i$ is the inner diameter of the boot in inches, F is the maximum applied load in pound-force (1bf), $\rho$ is the desired minimum radius of curvature in inches, $\theta$ is the angle of the neutral axis relative to the applied load, and E is the modulus of elasticity of the selected material in pounds per square inch. The length of the boot, in inches, in its undeflected state is represented by the relationship, $l(\theta)=\rho\theta$ It is a feature of the present invention that a cross section of a strain relief boot may be designed as a function of a desired bend radius, side load, and modulus of elasticity of a material used.

It is an advantage of the present invention that a bend radius of a cable in response to a side load may be controlled.

It is an advantage of the present invention that the length of the strain relief boot is minimized by providing a constant bend radius over a 90 degree transition in response to a side load.

It is an advantage of the present invention that a strain relief boot may be designed using a mathematical predictive model reducing the time and cost associated with design prototypes for varying materials, side loads, and bend radii.

DESCRIPTION OF THE DRAWINGS

Embodiments of the invention will now be described by way of example with reference to the accompanying drawings in which:

FIG. 1 shows a perspective view of a bend relief boot according to the teachings of the present invention.

FIG. 2 shows a perspective view of an SC connector terminated to a fiber optic cable with a bend relief boot according to the teachings of the present invention.

FIG. 3 shows a cross sectional view of the bend relief boot according to the teachings of the present invention.

FIG. 6 shows a cross sectional view of the connector and boot shown in FIG. 2 with a medium transverse load applied.

FIG. 7 shows a cross sectional view of the connector and boot shown in FIG. 2 with a maximum side load applied.

DETAILED DESCRIPTION OF THE PREFERRED EMBODIMENT

Figure 4:
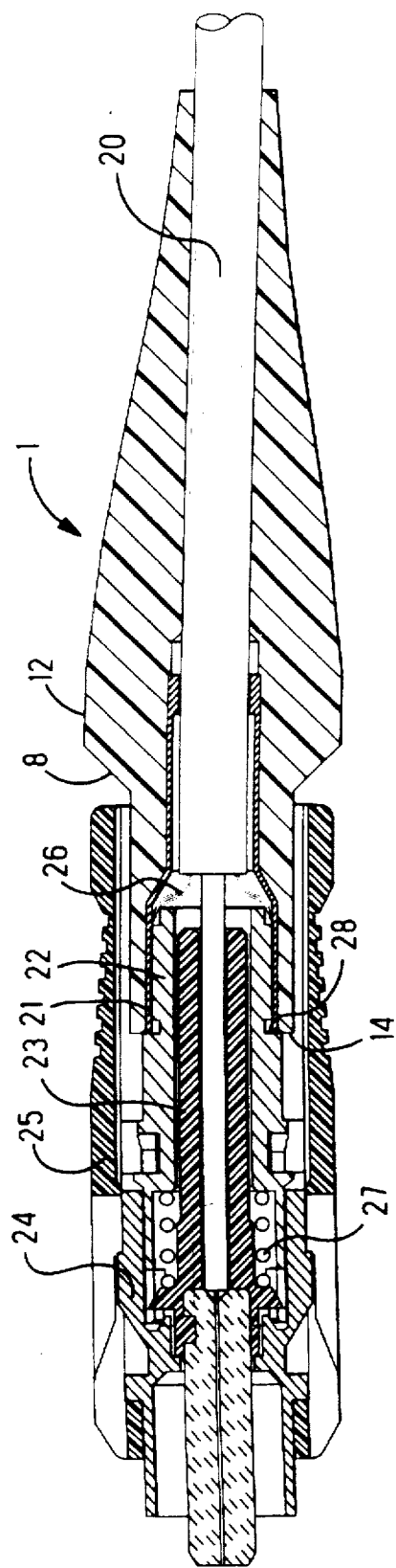
FIG. 4 shows a cross sectional view of the connector and boot shown in FIG. 2 with a zero transverse load.
Figure 5:
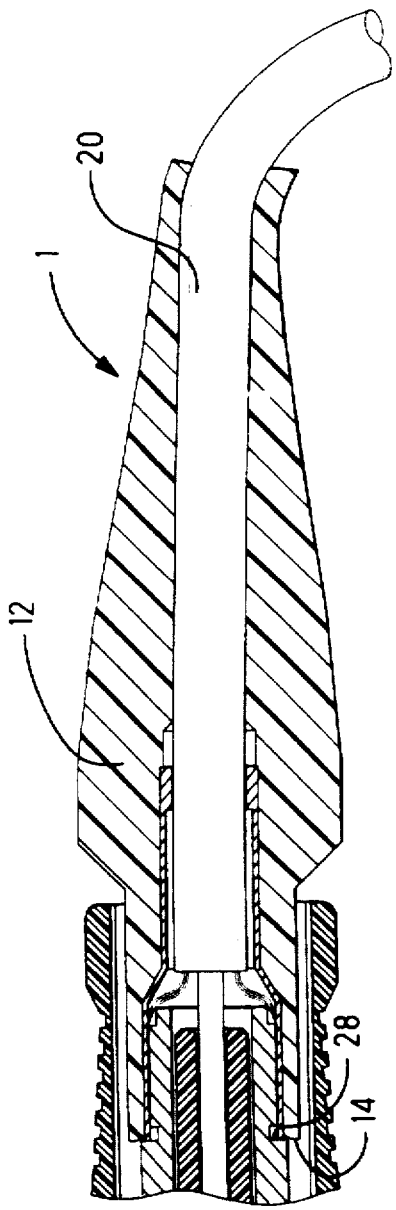
FIG. 5 shows a cross sectional view of the connector and boot shown in FIG. 2 with a small transverse load applied.

A preferred embodiment of a strain relief boot 1 according to the teachings of the present invention comprises a tubular length of polymeric material molded as a unitary piece. It is an object of the present invention to control the bend radius ($\rho$) of a fiber optic cable when the cable is exposed to a given side load. When used in conjunction with a terminated fiber optic connector, control of the bend is desired at the transition between a relatively stiff connector and a length of cable in response to a side load applied to the cable. The tubular length has a neutral axis 9 about which the boot is symmetrical in an undeflected state. The boot has a forward portion 11, an external transition 8, and a rearward portion 12. The forward portion 11 is generally tubular having a constant first outer diameter 5. An inner section of the forward portion 11 has first and second inner diameters 2,3 separated by a tapered lead-in 7. The external transition 8 is a tapered transition between the first outer diameter 5 and the outer diameter of the rearward portion 12. The rearward portion 11 has a third inner diameter 4.

The bend radius of the boot 1 is controlled by conforming the shape of the boot, and in particular the outer diameter of the rearward portion 12 relative to the third inner diameter 4. The outer and inner diameters ($d_o$ and $d_i$) vary according to a relationship as a function of the side load (F) in pound-force (lbf), the desired bend radius ($\rho$) in inches, and the modulus of elasticity (E) of the material from which the boot 1 is made, in lbf per square inch.

The relationship of the radius of curvature ($\rho$) to the bending moment (M), the moment of inertia (I), and the modulus of elasticity (E) of the subject material from which the cylinder is made, is represented as the equation:

$$\frac{1}{\rho} = \frac{M}{E \cdot I}$$

In a preferred embodiment, the shape of the boot is generally tubular, having associated with it an equation for the moment of inertia of a hollow cylinder. The equation for the moment of inertia (I) of a hollow cylinder where $d_o$ and $d_i$ are the outer and inner diameters, respectively, of the cylinder may be expressed as follows:

$$I_1 = \frac{\pi}{64}(d_o^4 - d_i^4)$$

Substituting the equation for the moment of inertia (I) of a hollow cylinder into the equation for the inverse of the radius of curvature ($\rho$), the following relationship results:

$$\frac{1}{\rho}| = 64 \frac{M}{E \cdot \pi \cdot (d_o^4 - d_i^4)}$$

An alternative embodiment of a strain relief boot according to the teachings of the present invention is similarly predictive by substituting the equation for the moment of inertia (I) for an alternative geometric shape such as a tubular member having a polygonal cross section into the equation for the inverse of the radius of curvature ($1/\rho$). In this way, the cross section of the boot may be designed for the appropriate radius of curvature ($\rho$). In the preferred case of a hollow cylinder, solving for the outer diameter ($d_o$) results in:

$$d_o = \left[ d_i^4 + \frac{64 M \rho^2}{E \cdot \pi} \right]^{\frac{1}{4}}$$

The bending moment (M) may be represented as a function of the force applied (F) in lbf, the radius of curvature ($\rho$) in inches, and the angle of the force applied ($\theta$) relative to the neutral axis 9 as follows:

$$M(\theta) = F \cdot \rho \cdot (1 - \cos(\theta))$$

Substituting the equation for the bending moment (M) into the equation for the outer diameter ($d_o$) results in a relationship between the outer diameter ($d_o$) in inches of a tubular boot as a function of its inner diameter ($d_i$) in inches, the force applied (F) in lbf, the desired radius of curvature ($\rho$), the angle of the applied load ($\theta$) relative to the neutral axis, and the modulus of elasticity (E) in lbf per square inch for the desired material. The following function results:

$$d_o(\theta)I = \left[ d_i^4 + \frac{64 \cdot F \cdot \rho^2 \cdot (1 - \cos(\theta))}{E \cdot \pi} \right]^{1/4}$$

A companion function determines the distance (1) of boot section in inches from the distal end of the connector:

$$l(\theta) = \rho \cdot \theta$$

In a preferred embodiment, the operative parameters include the modulus of elasticity (E) of the particular polymeric material from which the boot 1 is molded, the desired minimum radius of curvature ($\rho$), and the applied force (F). In a preferred embodiment, the material is ALCRYN* plastic (*a registered trademark of E.I. DuPont Company) is selected which has a modulus of elasticity of 920 lbf/inch². The desired minimum bend radius of curvature is 0.45 inches for a single mode fiber optic cable and the maximum applied load is 4.4 lbf as specified in Bellcore Generic Requirement GR-326-CORE issue #1. It is desirable to control the bend radius over a full 90 degree transition. The predictive model for the strain relief boot, therefore, varies over a 90 degree controlled bend wherein theta($\theta$) varies continuously from 0 to $\pi/2$ and has the associated appropriate length (1) in inches in an undeflected state.

An alternate embodiment of the boot according to the teachings of the present invention has an outer diameter that varies in segments that approximate a continuously varying curve.

In use, the strain relief boot is applied to a fiber optic cable shown generally at 20 and connector as is conventionally known in the art. The strain relief boot 1 and an eyelet 21 are first threaded onto an unterminated cable. The cable is stripped as appropriate and is then terminated to the fiber optic connector. The fiber optic connector shown in the drawings in FIGS. 2 and 4 is an SC connector, although any style connector is equally appropriate. Parts of the connector are shown generally as a ferrule 23, a spring 27, a plug body 24, a rear body 22, and a coupling grip 25. Prior to assembly of the coupling grip 25, strength members 26 of the fiber optic cable 20 are brought forward onto an exterior surface of the rear body 22. The eyelet 21 is brought over the rear body 22 capturing the strength members therebetween. The eyelet is crimped to retain the strength members. Retention of the strength members to the rear body transfers tensile forces applied to the cable to the connector rear body 22 and relieves most of the stress from the fiber. The strain relief boot 1 is slid over the crimped eyelet 21. A first and second inner diameter 2,3 of the boot receives the crimped eyelet 21. The forward portion 11 of the boot slides up and over the eyelet 21 until a front edge 14 of the forward portion 11 reaches a shoulder 28 on the rear body 22. The eyelet 21 rests between the first and second inner diameters 2,3. The inner diameter of the boot 1 tapers at an internal transition 6 from a second inner diameter 3 to the third inner diameter 4. The transition point between the end of the eyelet 21 and the exit of the fiber optic cable therefrom is the site at which the controlled bend theoretically begins. The third inner diameter 4 is approximately equal to and slightly larger than an external diameter of the jacket of the fiber optic cable 20 being terminated. It is desirable for the inner diameter of the boot 1 to engage the fiber optic cable 20 over most of its length. Accordingly, the inner diameter ($d_i$) is chosen to follow the dimensions of the cable to be terminated. In a preferred embodiment, therefore, it is the external diameter ($d_o$) that is chosen to vary over the length of the boot 1. Resilient expansion of the first and second inner diameter 2,3 of the boot 1 results in frictional interference of the boot 1 to the eyelet 21. The frictional interference therebetween retains the boot 1 to the connector.

I claim:

1. A bend relief boot (1) comprising a tubular length of polymeric material disposed at a distal end of a connector, the tubular length having a neutral center axis (9) characterized in that:

an outer diameter ($d_o(\theta)$) of the boot varies as a function of its distance from said distal end of the connector in its fully deflected state following the relationship, $$d_o(\theta)l = \left[ d_i^4 + \frac{64 \cdot F \cdot \rho^2 \cdot (1 - \cos(\theta))}{E \cdot \pi} \right]^{1/4}$$

wherein $d_i$ is the inner diameter of the boot, F is the maximum applied load, $\rho$ is the desired minimum radius of curvature, $\theta$ is the angle of the applied load relative to said neutral axis, and E is the modulus of elasticity of the selected material.

2. A bend relief boot as recited in claim 1 wherein the outer diameter continuously varies over the length of the boot following said relationship.

3. A bend relief boot as recited in claim 1 wherein the outer diameter varies in linear segments as a function of distance from said distal end of the connector over the length of the boot.

4. A bend limiting strain relief boot as recited in claim 1 wherein a length of boot is sufficiently long to extend over a 90 degree transition.

5. A bend limiting strain relief boot having a hollow polygonal cross section and being made of a material having a modulus of elasticity of E and outer and inner dimensions of the boot are selected to control the bend radius according to the relationship:

$$d_o = \left[ d_i^4 + \frac{64M\rho^2}{E \cdot \pi} \right]^{\frac{1}{4}}$$

wherein $\rho$ is the desired minimum radius of curvature, 1 is the length of said boot, M is the bending moment, and I represents the equation for the moment of inertia relationship:

$$I = \frac{\pi(d_o^4 - d_i^4)}{64}$$

wherein $d_o$ is the outer diameter of the boot and $d_i$ is the inner diameter of the boot.

* * * * *